United States Patent

[11] 3,601,387

[72] Inventor Jack B. Pavlich
7008 W. 40th St., Stickney, Ill. 60402
[21] Appl. No. 815,880
[22] Filed Apr. 14, 1969
[45] Patented Aug. 24, 1971

[54] PIPE ALIGNING TOOL
3 Claims, 4 Drawing Figs.
[52] U.S. Cl. .................................................. 269/48.1
[51] Int. Cl. ................................................... B23q 3/14
[50] Field of Search .......................................... 269/48.1, 52; 29/493

[56] References Cited
UNITED STATES PATENTS
| | | | |
|---|---|---|---|
| 2,323,039 | 6/1943 | Hill .............................. | 269/48.1 |
| 2,615,413 | 10/1952 | Adams ........................ | 269/48.1 X |
| 3,330,021 | 7/1967 | Jacobsen ..................... | 269/48.1 X |

Primary Examiner—Andrew R. Juhasz
Assistant Examiner—Donald D. Evenson
Attorney—Merriam, Marshall, Shapiro & Klose ABSTRACT: An alignment tool for aligning pipe fittings or short sections of pipe with the main run of pipe preparatory to completing a joint comprises a shaft having several threaded portions, at least one of which has right-hand threads and at least one of which has left-hand threads. Each threaded portion is provided with an internally threaded collar which meshes with the threads of the shaft. Attached to each collar are pivotally connected links, the outer ends of which are attached to elongated shoes extending longitudinally of the shaft. Rotation of the shaft, as by a crank, causes the shoes to move radially outwardly, thereby aligning sections of pipe or pipe fittings through the bore of which the tool is passed and expanded.

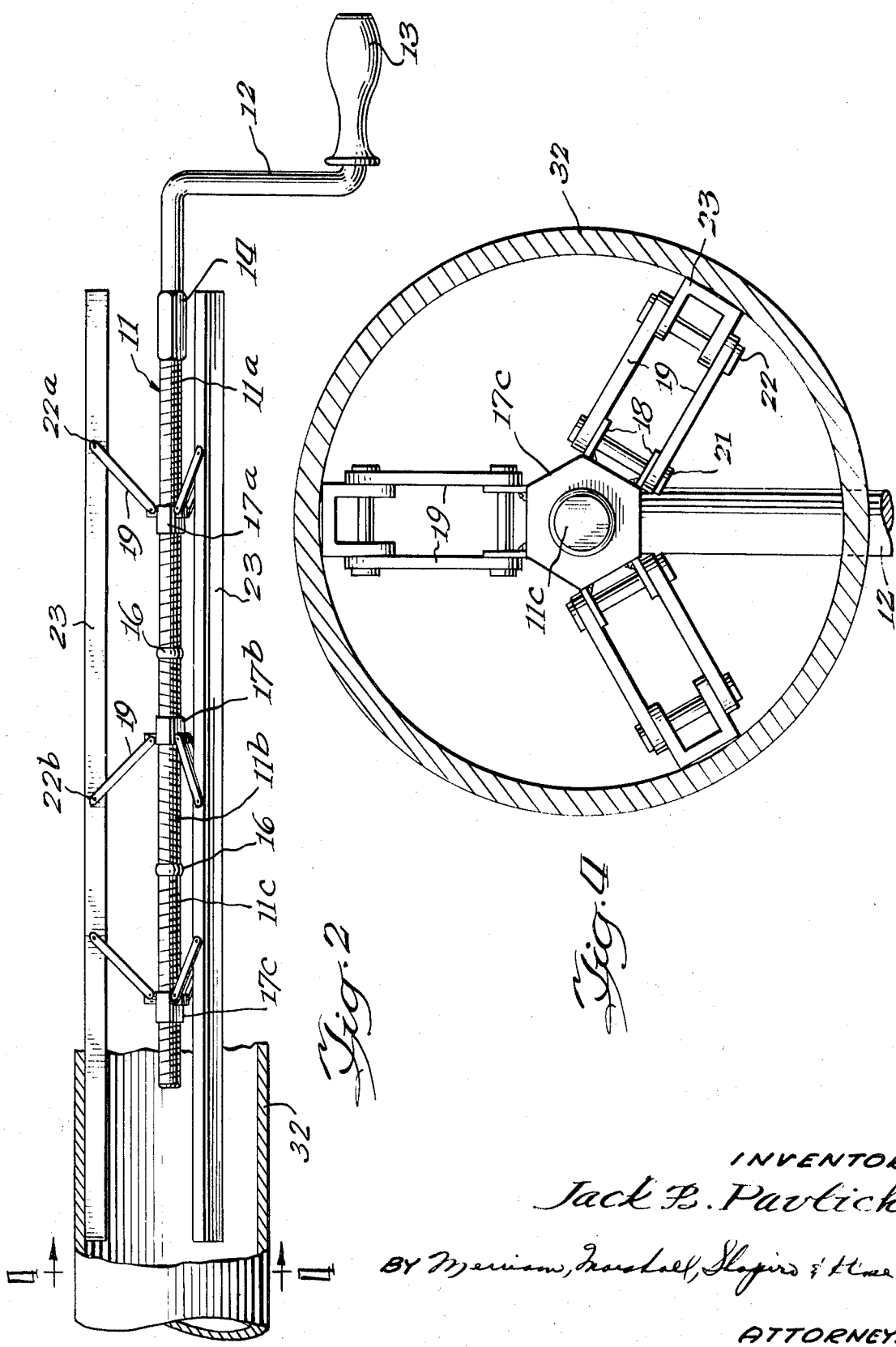

PIPE ALIGNING TOOL

This invention relates to a pipe aligning tool, and more particularly to a tool which is useful for aligning a fitting and a section of pipe to which the fitting is to be joined.

The fabrication of certain plumbing systems in homes, office buildings and the like, which employ relatively large diameter (up to 6 inches or more) pipe, typically made of cast iron with bell-and-spigot joints, has customarily required the services of two men. In the usual manner of operating, one man holds a fitting, such as an elbow or tee, in the proper position so that the bell and spigot portions of the joint are in the proper mating location, while the other applies caulking and lead to complete the joint. It is obvious that the necessity for having an extra man to hold the pieces in position while the joint is being completed greatly increases the cost of installing such systems.

In accordance with the present invention, there is provided a pipe aligning tool of a simple and sturdy construction which can be used to position and maintain the fitting in its proper location relative to the pipe while the bell-and-spigot or other joint is completed by one man. In addition to being easy to operate and quick and accurate in aligning the fitting with the pipe, the tool is readily adaptable for use with pipe over a wide range of sizes.

Briefly, the tool comprises a number of elongated shoes, angularly spaced about and parallel to a threaded shaft which is equipped with a crank for rotation, By rotating the crank the elongated shoes are caused to move radially outwardly while maintaining their parallel relationship to the shaft and to each other. In operation, the tool in its collapsed condition is passed through the bore of the fitting and into the pipe. The tool is then actuated, causing the elongated shoe members to move radially outwardly until the fitting is securely held in position in accurate alignment with the pipe. After the joint has been completed and the fitting is firmly attached to the pipe, the tool is removed by collapsing and withdrawing it from the bore of the fitting.

The invention will be better understood from the following detailed description thereof, taken in conjunction with the accompanying drawings, in which:

FIG. 2 is an elevational view of the tool in its expanded position within a pipe, with a section of the pipe torn away;

FIG. 4 is a sectional view along the line 4—4 of FIG. 2, showing the tool in its expanded position within the bore of a pipe or fitting.

Figure 3:
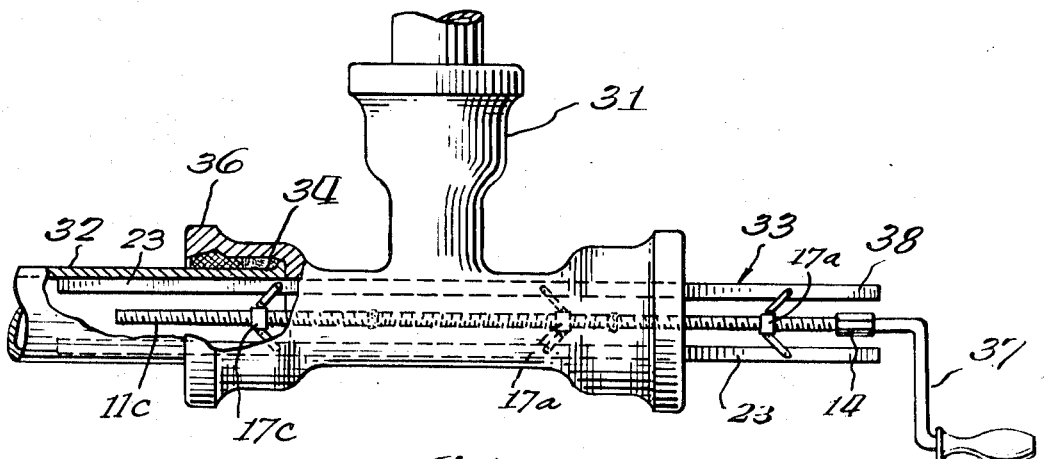
FIG. 3 is a view showing the tool in operation holding a fitting in position on the end of a pipe for completion of the joint therebetween.
Figure 1:
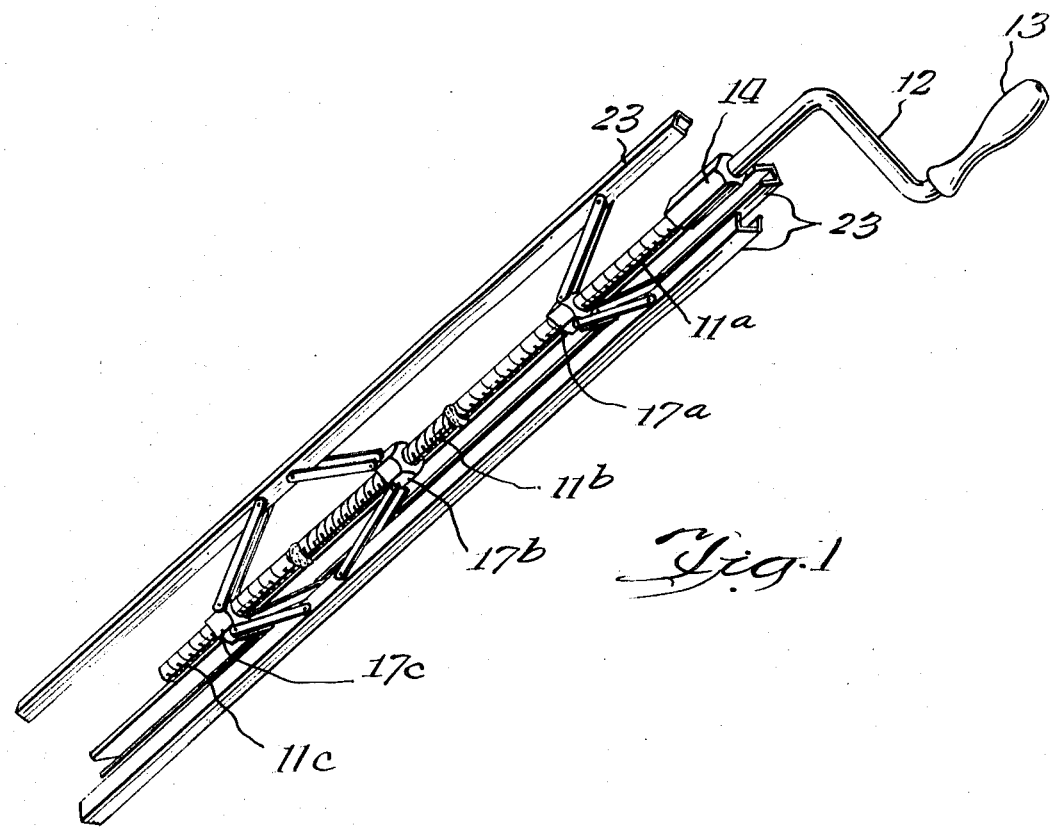
FIG. 1 is a perspective view of the tool in its partially collapsed position.

Referring to FIGS. 1, 3, and 4, it will be seen that the tool comprises a shaft 11 provided at one end with a crank 12 and a crank handle 13, the crank being attached to the shaft by means of connector 14. Shaft 11 is provided along its length with three threaded zones 11a, 11b, and 11c. In the preferred embodiment shown in the figures, adjacent threaded zones have opposite senses of rotation. In other words, if the threads in sections 11a and 11c are right-hand, those in section 11b are left-hand, and vice versa. Serving as separators between adjacent threaded zones are stops 16 which limit the extent of travel of internally threaded collars 17a, 17b and 17c, the threads of which mesh with the threads of the corresponding threaded zones 11a, 11b and 11c.

Each of collars 17a, b, and c is provided with a pair of outwardly extending lugs 18 (FIG. 4) and a pair of links 19 which are pivotally connected to the lugs 18 by means of pin 21. The outer ends of links 19 are also pivotally connected by pins 22 to elongated shoes 23 which in the embodiment shown are sections of steel channel.

Links 19 are all of the same length, and as shown in the drawing, are so connected between collars 17 and shoes 23 so as to locate the shoes in a position parallel to the longitudinal axis of shaft 11. It will further be seen that the shape of the figure formed by the length of a shoe between adjacent link connections, the links themselves, and the section of shaft 11 between adjacent collars 17 is an isosceles trapezoid. Further, the pitch of the threads in the threaded portions of shaft 11 is the same in each of the threaded zones 17a, b, and c (although opposite in sense in some of them). Accordingly when the shaft is rotated, each of collars 17 will move the same distance, thus maintaining the symmetry of the figures and maintaining each of shoes 23 in a parallel relationship with the shaft 11.

The figures illustrate the preferred embodiment of the invention, in which the adjacent threaded areas 11a, 11b, and 11c along shaft 11 have threads of opposite senses of rotation. As an alternative, the tool can also be made with only two adjacent threaded zones (e.g. 11a and 11b), having opposite senses of rotation, one of which zones having two threaded collars, the other having only one. In this case, the configuration formed by the elements of the tool would consist of one parallelogram and one trapezoid, the combination constituting a rigid structure.

Shoes 23 will be held in rigid relationship relative to shaft 11 provided at least one trapezoidal configuration previously described is maintained. If, however, the shoes are expanded sufficiently so that the distance between adjacent collars (e.g., 17a and 17b) equals the distance between the points of connection (e.g., 22a and 22b) of the corresponding links 19 on shoe 23, the trapezoidal configuration then becomes a parallelogram, and the rigidity of the construction is lost. To prevent this occurrence, stops 16 may be so suitably placed as to limit the travel of one or more collars on shaft 11.

A typical use of the tool of the invention is illustrated in FIG. 3, showing the connection of a cast iron tee 31 to a section of pipe 32. As shown, tool 33 has been inserted through the bore of fitting 31 into the bore of pipe 32 with the spigot end 34 of pipe 32 in place in the bell portion 36 of fitting 31. The tool 33 has been actuated by rotation of crank 37 to bring the shoes 38 of the tool into firm contact with the bore of pipe 32, thereby aligning the bores of fitting 31 and pipe 32 and also holding fitting 31 in suitable position for completion of the bell-and-spigot joint. After the joint is completed in conventional fashion, e.g., by caulking and leading, the shoes 38 of tool 33 are collapsed by turning crank 37 in the opposite direction and the tool is withdrawn from the bore of the fitting.

The tool can be used in a similar manner to complete joints of other types, e.g., welded joints as used in the steam fitting and pipe fitting trades. In such use, the fitting, held in position by the aligning tool, is connected to the pipe with tack welds. The aligning tool is then removed and the joint is completed in the usual manner.

It will be seen that the use of the tool permits quick and accurate alignment of a pipe fitting to a pipe to be readily accomplished by one man, rather than two as heretofore, thus obviously decreasing the cost of making the connection. Further, because of the quick and easy adjustment which can be made in the diameter of the tool, a given tool can be used for making such connections to pipes over a wide range of sizes.

The foregoing detailed description has been given for clearness of understanding only, and no unnecessary limitations should be understood therefrom, as modifications will be obvious to those skilled in the art.

I claim:

1. A pipe aligning tool comprising:
   a shaft having at least two threaded portions, at least one of which has right-hand threads and at least one of which has left-hand threads;
   at least three internally threaded collars spaced on said shaft and meshing with the threaded portions thereof, at least one of said collars having right-hand threads and at least one having left-hand threads;
   a plurality of elongated shoes angularly spaced about the axis of said shaft;

a plurality of links each having an inner end which is pivotally connected to one of said collars and an outer end which is pivotally connected to one of said shoes, each collar being connected to each shoe by at least one of said links; and means for rotating said shaft relative to said collars, whereby said shoes are caused to move radially relative to said shaft.

2. A pipe aligning tool comprising:

a shaft having three threaded portions, two of said portions having threads of the same sense of rotation, said two portions being separated by the third portion which has an opposite sense of rotation;

at least three internally threaded collars spaced on said shaft, at least one collar meshing with each of said threaded portions thereof;

at least three elongated shoes symmetrically angularly spaced about and parallel to the axis of said shaft;

a plurality of links of equal length, each having an inner end which is pivotally connected to one of said collars and an outer end which is pivotally connected to one of said shoes, each collar being connected to each shoe by at least one of said links; and crank means for rotating said shaft relative to said collars, whereby said shoes are caused to move radially relative to said shaft while maintaining a parallel relationship therewith.

3. The tool of claim 2 which is provided with at least one stop along the length of said shaft for limiting the longitudinal motion of said collars relative thereto.